United States Patent [19]

Grenzebach et al.

[11] Patent Number: 4,661,657

[45] Date of Patent: Apr. 28, 1987

[54] METHOD AND APPARATUS FOR TRANSMITTING AND RECEIVING ENCODED DATA

[75] Inventors: Kurt Grenzebach, Bebra; Wolfgang Hopf, Heringen, both of Fed. Rep. of Germany

[73] Assignee: Siemens Aktiengesellschaft, Berlin and Munich, Fed. Rep. of Germany

[21] Appl. No.: 483,875

[22] Filed: Apr. 11, 1983

[30] Foreign Application Priority Data

May 7, 1982 [DE] Fed. Rep. of Germany ....... 3217261

[51] Int. Cl.⁴ .............................................. H04L 9/00
[52] U.S. Cl. .................................... 380/21; 375/106; 375/112; 380/48
[58] Field of Search ............... 178/22.08, 22.09, 22.13, 178/22.17; 370/60, 94 U; 375/106, 109, 114, 112; 371/32, 31, 37, 42

[56] References Cited

U.S. PATENT DOCUMENTS

| | | | |
|---|---|---|---|
| 4,027,243 | 5/1977 | Stackhouse et al. | 375/114 |
| 4,110,558 | 8/1978 | Kageyama et al. | 375/109 |
| 4,168,469 | 9/1979 | Parikh et al. | 375/114 |
| 4,208,544 | 6/1980 | Burke, Jr. | 178/22.17 |
| 4,211,891 | 7/1980 | Glitz | 375/106 |
| 4,353,126 | 10/1982 | Bergmann | 178/22.17 |
| 4,366,573 | 12/1982 | Ranch | 375/106 |
| 4,438,824 | 3/1984 | Mueller-Schloer | 178/22.08 |
| 4,484,025 | 11/1984 | Ostermann et al. | 178/22.09 |
| 4,491,945 | 1/1985 | Turner | 370/60 |
| 4,507,782 | 3/1985 | Kunimasa et al. | 370/60 |

FOREIGN PATENT DOCUMENTS 0142903 11/1979 Japan .................... 372/94 U

OTHER PUBLICATIONS

"Proposed Organisation for Packet-Switched Data, Communication Network", Grimsdale et al., vol. 119 #12, 12/72, Electronics, pp. 1677-1682.
"Packets Put More on the Line", by Beanment et al., Record (AT&T Bell Lboratories) 11/83.
X.25-Redefinition of Network Hardware by David Gilbert, Data General Europe, published in Systems International Feb. 1979, pp. 37 through 40.
Recommendation X.25-Interface Between Data Terminal Equipment DTE and Data Circuit Terminating Equipment DCE for Terminals Operating in the Packet Mode on Public Data Networks, Geneva 1976, amended at Geneva 1980, pp. 100-123 and 178-181.

Primary Examiner—Salvatore Cangialosi
Assistant Examiner—Aaron J. Lewis

[57] ABSTRACT

Method and apparatus for transmitting encoded data from a transmitting station to a receiving station wherein the transmitting and receiving data stations contain data terminal equipment, cipher equipment and a transmission unit and wherein the data is transmitted from the cipher equipment in the form of user data (BD) in the form of data blocks (DB) which contain a heading (K) with control information and wherein at least one of the data blocks (DB), the user data (BD) are replaced by the cipher equipment associated data (SD) and wherein the heading (K) remains unchanged. The data block which has been replaced by the cipher associated data is again generated and is subsequently transmitted.

11 Claims, 4 Drawing Figures

METHOD AND APPARATUS FOR TRANSMITTING AND RECEIVING ENCODED DATA

BACKGROUND OF THE INVENTION

1. Field of the Invention

This invention relates in general to method and apparatus for transmitting encoded data.

2. Description of the Prior Art

It is known generally to synchronize ciphering equipment in a transmitting and a receiving station and to use codes for the encoding and decoding which can be operated synchronously. This is accomplished by using transmitting ciphering equipment-associated data from the transmitter to the receiving station. It is also known to transmit data from a transmitting station to a receiving station according to prescribed transmission procedures using data blocks. An example of such a procedure dependent data transmission is a system of transmission according to CCITT recommendation X.25 in a packet switching data network. This data network is known in the Federal Republic of Germany as DATEX-P. In such packet switching data networks the messages to be transmitted from the transmitting station to the receiving station are dissected into individual packets. Each packet receives its own heading with a control and an address field as well as its own check character sequence. The maximum packet length is 128 octets. The division of the message upon combination after transmission is carried out by the corresponding data terminal equipment itself. The data terminal equipment are connected to corresponding packet switching centers which are connected to each other. The respective received switching center checks each packet for transmission errors. Packets which are received error free are responded to with a positive acknowledgement. Packets which have errors are requested to be sent again by emitting a negative acknowledgement. Packets which have errors are requested to be sent again by emitting a negative acknowledgement. The individual packets can be transmitted in various ways. As a result, fast transmission and matching to the respective user status of the transmission links and of the packets switching centers is achieved.

Transmission can occur over selected connections or over permanently connected lines. When using selected connections, the data terminal equipment of the transmitting and receiving stations are only at times connected to each other over the data network. Thus, steps for the connection setup, data transmission and connection cleardown occur. When a dedicated connection is used, no connection setup and connection cleardown phase is required. The actual data transmission occurs in a manner similar to that for the selected connection. Both types of connection are virtual connections, in other words, the transmission can occur over different transmission links but appears to the user as though a single physical connection were present.

The interface to the data terminal equipment defined by CCITT recommendation X.25 is subdivided into three function levels with level one describing the setup of the connection path and the electrical and functional properties of the interface. Level two specifies the transmission procedure for the transmission of the packets between the data terminal equipment and the packet switching exchange. Level three determines the packet formats and the sequence of the packet transmission between the data terminal equipment and the packet switching exchange when a virtual call and a virtual dedicated circuit is utilized.

In case the data is encoded when transmitted it is necessary to transmit ciphering equipment associated data from ciphering equipment at the transmitting subscriber to the ciphering equipment at the receiving subscriber.

SUMMARY OF THE INVENTION

It is therefore the object of the invention to transmit cipher equipment associated data in conformity with the procedure over a data network wherein the data are transmitted blockwise according to a prescribed data transmission procedure.

The invention is based on the concept of replacing the user data in at least one respective data block of the cipher equipment associated data and to retain the transmission related data which are preferably accommodated in the heading of the data block unchanged. It is possible to intermediately store the user data which has been replaced by the cipher equipment related data in the cipher equipment and after transmission of the data block with the cipher equipment related data to generate a data block in the cipher equipment itself which with an unaltered heading now contains the user data. In order to prevent the data terminal equipment from emitting further data blocks during the transmission of the cipher equipment related data, the cipher equipment signals to the data terminal equipment that it is not ready to receive additional data. Instead of the intermediate storage of the user data in the cipher equipment, it is also expedient to emit a back space command from the cipher equipment of the receiving station to the data terminal equipment after reception of the cipher equipment associated data and the back space statement results in a back space request to the data terminal equipment of the transmitting station and initiates a repeat of the corresponding data block. The data transmission subsequently occurs in a conventional manner whereby the user data are encoded by the ciphering equipment in the transmitting station and are decoded by the ciphering equipment in the receiving station.

In the event the transmission of the data does not occur over a dedicated circuit but occurs over a switching network the call setup and call cleardown occurs in a known manner whereby the cipher equipment is enabled and all data blocks required for the call setup and cleardown are connected through in an unaltered fasion.

The method of the invention is particularly suited when transmitting data in a system corresponding to the CCITT recommendation X.25. Expediently, the data block with the cipher equipment-associated data is transmitted at the beginning of the transmission. However, it is also possible to repeatedly transmit the data blocks with the cipher equipment-associated data after a respectively prescribed number of data blocks or to divide the cipher equipment associated data over a plurality of data blocks. If need be, the data blocks with the cipher equipment-associated data can also be specially identified so that the cipher equipment in the receiving station checks all data blocks for the existence of the special identifier and takes the corresponding data block. This is particularly applicable when the transmission occurs over a dedicated circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
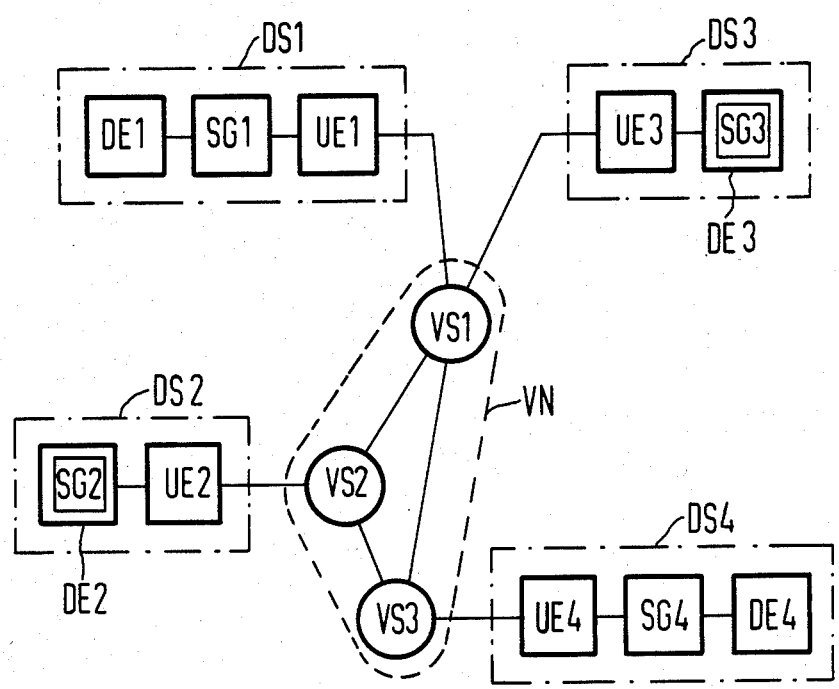
FIG. 1 is a block diagram illustrating the data transmission network using a packet switching network.

FIG. 1 illustrates a plurality of data stations DS1, DS2, DS3 and DS4 which are connected to a packet switching network VN having a plurality of packet switching centers VS1, VS2 and VS3. The data stations DS1 and DS4 contain data terminal equipment DE1 and DE4 which are connected, respectively, to external ciphering machines SG1 and SG4, respectively. A transmission unit UE1 is connected to the external ciphering machine SG1 and a transmission unit UE4 is connected to the external ciphering machine SG4. In the data stations DS2 and DS3 the cipher equipment SG2 and SG3 is integrated in the data terminal equipment DE2 or DE3 respectively. It is necessary for an encoded transmission of data, for example, from data station DS1 to the data station DS2 that the same cryptological key exists in both data stations. For this purpose, it is necessary to allow the cipher equipment SG1 and SG2 to operate proceeding from specific normal positions. This is achieved by transmitting cipher equipment-associated data from the data station DS1 to the data station DS2. The cipher equipment associated data can also contain special cryptological keys. The transmission of the cipher equipment-associated data must occur with the same data transmission procedure within the packet switching network VN through which the user data are also transmitted. The data transmission procedure in the present sample embodiment is the transmission procedure described in CCITT recommendation X.25. The connection setup from the data station DS2 is initiated by the data terminal equipment DE1 and DE2. In this case, the cipher equipment SG1 and SG2 are opened and through-connect the data blocks required for the connection setup and the cleardown so that the data is unaltered.

When transmission of the user data occurs, the cipher equipment SG1 receives the first data block with the user data from the data terminal equipment DE1 and accepts all important data of the transmission frame and forms a new data block wherein the user data are replaced by the cipher equipment-associated data. This data block is transmitted as the first data block from the data station DS1 to the data station DS2 and remains in the cipher equipment SG2 which is contained in data station DS2. Subsequently, the data block with the original user data is transmitted and this data is supplied as an output to the data terminal equipment DE2.

When using a dedicated circuit, the data blocks with the cipher equipment-associated data are inserted after a prescribed plurality of data blocks. Expediently, the data blocks are specifically identified by control characters in order to increase the certainty of recognition.

Figure 2:
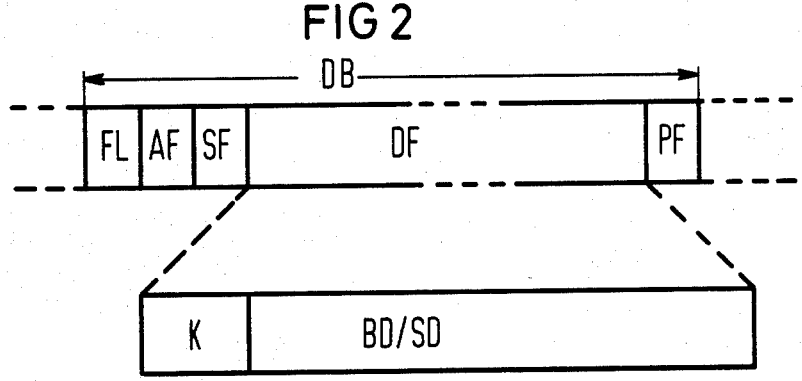
FIG. 2 illustrates the format of a data block.

FIG. 2 illustrates the transmitted data blocks which start with a heading which contains the information required for the execution of the data transmission with three successive characters FL, AF and SF each containing eight bits. The beginning of the data block DB is formed by the block delimiter FL which serves to produce the bit synchronism between the transmitting and the receiving data stations. The following address field AF specifies whether the data block DB is directed to the data terminal equipment DE or to the transmission unit UE and simultaneously whether the respective block is an instruction or a report and instructions are identified with the address of the cooperating location and reports are identified with their own particular address. The following control field SF indicates the type of data block DB. A distinction is made between information and control data blocks for the receiving data terminal equipment DE.

The data field DF forms the actual packet of level three. Each data block DB concludes with a check character sequence PF or by a further block delimiter FL. Characters which are represented in two octets are derived from the overall bit stream of a data block DB for the check character sequence PF. In the receiving data station DS2, the data block DB traverses the same algorithm and the check character sequences PF are added upon emission of the data block DB and are generated in the receiving station and are compared with each other. When they do not coincide then the data block DB is considered as being falsely transmitted and is not acknowledged.

The data field DF is formed of a heading K and an area for user data BD. The heading K contains control information which specifies whether the user data BD represent useful data or control data. The control data represent packets for the connection request, connection cleardown, flow control, interrupt, reset and repeat. Instead of the user data BD cipher equipment-associated data SD can be transmitted from the cipher equipment SG1 in the transmitting data station DS1 to the cipher equipment SG2 in the receiving data station DS2. The heading K in the data field DF, the block delimiter FL, the address field AF and the control field SF remain unaltered. Further details of the transmission of the cipher equipment associated data is described relative to FIG. 3.

Figure 3:
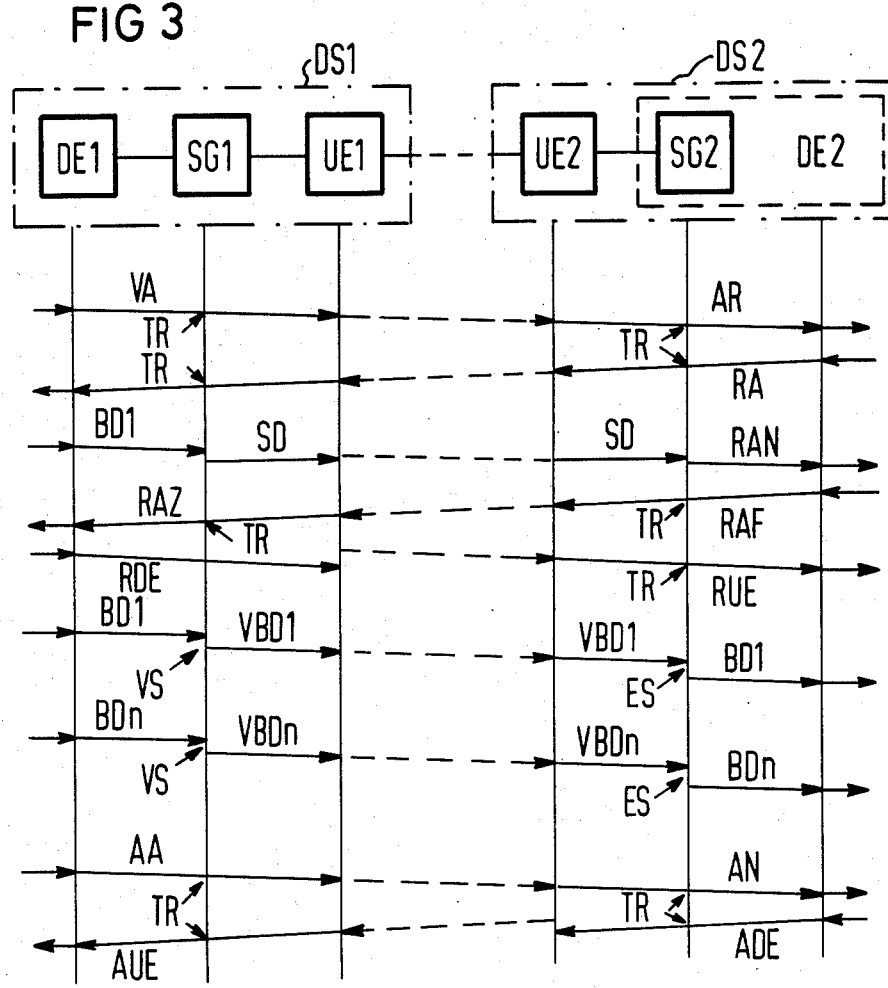
FIG. 3 illustrates the individual operating phases during data transmission.

FIG. 3 illustrates the operating phases of a selected virtual connection between the data station DS1 and the data station DS2. For setup of the connection the data terminal DE1 generates a call request packet which is transmitted to the data station DS2. The cipher equipment SG1 is opened for this example which is indicated by the arrow TR. On the basis of the call request packet, the data terminal equipment DE2 is informed of an incoming call AR. Acceptance of the call RA is acknowledged and the setup of the connection is communicated to the data terminal DE1.

In case no cipher machines are provided in the data stations DS1 and DS2, the actual data transmission now begins. Using the cipher equipment SG1 and SG2, the cipher equipment-associated data are first transmitted however. In the same manner as in the standard data transmission, the data terminal equipment DE1 generates the first data block DB with user data BD1. The cipher equipment SG1 removes the user data DB1 from the data block DB and replaces the data by the cipher equipment associated data SD. At the same time, it informs the data terminal DE1 TR that it is not ready to receive which is done to prevent the data block terminal equipment DE1 from emitting further data block DB. The cipher equipment associated data SD are transmitted to the data station DS2 during the first data block DB instead of the user data BD1. These are recognized in the cipher equipment SG2 and are retained. Subsequently, the cipher equipment SG1 and SG2 are synchronized using the cipher equipment-associated data. The cipher equipment SG2 emits a back space signal RAN to the data terminal DE2 which results in a back space request RAF which is communicated to the data terminal equipment DE1 as a back space command RAZ. The data terminal equipment DE1 in turn transmits a back space acknowledgement RDE or respectively, RUE to the data station DS2. As a result of the back space statement RA2, the data terminal equipment DE1 repeats the first data block DB and sends it to the cipher equipment SG1.

The two cipher machines SG1 and SG2 are synchronized by the cipher equipment-associated data SD and are ready to encode or respectively decode the user data BD1. The cipher machine SG1 is at this time no longer open but rather encodes the user data BD1 and transmits the encoded user data VBD1 to the data station DS2. At station DS2, the data are decoded in the cipher equipment SG2 as indicated by arrows VS or, respectively, ES. The decoded user data BD1 are supplied to the data terminal equipment DE2. Thus, the encoding or decoding is repeated until the last data block DB with the user BDn has been transmitted in the form of encoded user data VBDn and has again been supplied to the data terminal equipment DE2 as user data BDn.

Subsequently, the connection is cleared in a known manner whereby the cipher equipment SG1 and SG2 are again opened. The data terminal equipment DE1 first produces a cleardown request AA which is supplied to the data terminal equipment DE2 as a cleardown statement AN. This in turn generates a cleardown acknowledgment ADE and a cleardown acknowledgement AUE which is generated by the transmission unit UE1 and is supplied to the data terminal equipment DE1.

Additional cipher equipment-associated data SD can be transmitted after a prescribed plurality of data blocks DB containing user data BD have been transmitted. It is also possible to divide the cipher equipment-associated data over a plurality of data blocks DB. It is further conceivable to store intermediately the user data BD1 of the first data packet in the cipher equipment SG1 and after transmission of the cipher equipment-associated data to automatically generate a further data block DB which contains the user data BD1.

In the event a permanently connected virtual connection is provided instead of a selected virtual connection, the transmission of the user data BD occurs in a corresponding manner but the call setup and the call cleardown phases are eliminated since they are not needed. It is also conceivable particularly when using transmission in a permanently connected virtual connection to specifically identify the blocks which contain the cipher equipment associated data SD.

Figure 4:
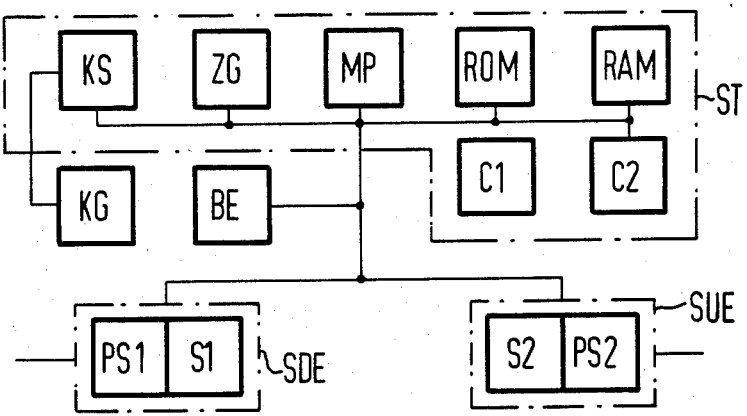
FIG. 4 is a block diagram of a ciphering machine.

FIG. 4 illustrates the cipher equipment SG which contains a control unit ST which preferably includes a microcomputer. The microcomputer is formed of a microprocessor MP, a timer or internal clock ZG, a read only memory ROM and a random access memory RAM all of which are connected to a data bus DB. The control unit ST also contains control devices C1 and C2 which are associated with the microcomputer and process a direct memory access DMA or respectively, interrupt request.

Also connected to the data bus DB is a cryptogenerator interface KS which produces the connection of the control ST to the cryptogenerators KG. An operating unit BE is connected to the data bus DB and is provided with operating elements for the cipher equipment SG. Interface units SDE and SUE are also connected to the data bus so as to match the cipher equipment SG to the data terminal equipment DE or to the transmission unit UE. These interface units SDE and SUE respectively contain parallel to serial and serial to parallel converters PS1 or, respectively, PS2 and control units S1 and S2 which protect the procedure conforming transmission of the data blocks. Such control units are known in the art and are commercially available as, for example, type designation WD 2511. Such control units perform a multitude of tasks such as for example data protection generating and evaluating the block delimiter field FL, the address field AF and the control field SF as well as recognizing a data block.

The microcomputer monitors the data traffic between the data terminal DE and the transmission unit UE and after the call setup supplies a dialed virtual connection or, respectively, after a prescribed plurality of data blocks DB are received with a permanently connected virtual connection to initiate the replacement of the user data DB by the cipher equipment-associated data SD and the corresponding signals which identify the fact that the equipment is not ready to receive. Also, the microcomputer initiates the synchronization of the cryptogenerator upon transmission or respectively upon reception of the cipher equipment associated data. Also, generation of the back space statement and the encoding as well as the decoding of the user data BD occurs under the control of the microcomputer.

During the call setup and the call cleardown, the microcomputer connects through the respective incoming data blocks DB between the interface units SDE and SUE in an unaltered form.

Although the invention has been described with respect to preferred embodiments, it is not to be so limited as changes and modifications can be made which are within the full intended scope of the invention as defined by the appended claims.

We claim as our invention:

1. The method of transmitting encoded data from a transmitting data station to a receiving data station wherein the transmitting and the receiving data stations respectively each contain data terminal equipment, cipher equipment and a transmission unit and wherein synchronizing data for synchronizing the receiver cipher equipment with the cipher equipment in the transmitter are transmitted from the cipher equipment of the transmitting data station to the cipher equipment of the receiving data station, comprising the following steps:

(a) establishing a connection between the transmitting data station (DS1) and the receiving data station (DS2) and the data terminal equipment (DE1) of the transmitting data station (DS1) transmitting user data (BD) in the form of data blocks (DB) which, in addition to the user data (BD), contain a heading (K) with control information;

(b) replacing in at least one of the data blocks (DB), the user data (BD) by the synchronizing data (SD) and leaving the heading (K) unaltered; and (c) subsequently generating and transmitting the data block (DB) whose user data (BD) were replaced by the synchronizing data (SD); and characterized in that the data block (DB) in which the user date (BD) were replaced by the synchronizing data (SD) is, when a back space request is received is generated again in the data terminal equipment (DE1) of the transmitting data station (DS1) and is retransmitted.

2. The method according to claim 1 characterized in generating and supplying in cipher equipment (SG1) of the transmitting data station (DS1) a signal (NE) to the appertaining data terminal equipment (DE1) during generation of the data block (DB) with the cipher equipment-associated data (SD) and said signal indicating non-readiness to receive.

3. The method according to claim 2, characterized in transmitting the data block (DB) with the cipher equipment-associated data (SD) in a procedure conforming to CCITT recommendation X.25.

4. The method according to claim 1 wherein transmitting occurs over a selected connection, and the data block (DB) with the cipher equipment-associated data (SD) occurs immediately after the connection is made between the transmitting data station (DS1) and the receiving data station (DS2).

5. The method according to claim 1 wherein transmitting occurs over a permanent connection, and the transmission of the data block (DB) with the cipher equipment-associated data (SD) occurs at the beginning of the transmission as a first data block (DB).

6. The method according to claim 5, comprising providing control characters in that data block (DB) which contain the cipher equipment-associated data (SD), and this data block (DB) being distinguishable from a data block (DB) with user data (DB) by control characters.

7. The method according to claim 1 wherein a data block (DB) with cipher equipment-associated data (SD) is transmitted after a respectively prescribed plurality of data blocks (DB) with user data (DB) have been transmitted.

8. The method according to claim 1 characterized in that the cipher equipment-associated data (SD) are respectively divided and transmitted over a plurality of data blocks (DB).

9. Apparatus for transmitting encoded data between a first data station to a second data station comprising, a first data terminal, a first ciphering unit and a first transmission unit interconnected in said first data station, a second data terminal, a second ciphering unit and a second transmission unit interconnected in said second data station, a packet switching network connected to said first and second data stations to interconnect them, and said first data station produces a data format which includes a heading and data blocks and has means for replacing and storing at least one of said data blocks with synchronizing data for synchronizing said first and second ciphering units and subsequently transmitting said stored data block to said second data station and including a back space request generator supplying a signal to said first data station to cause it to transmit said stored data block.

10. The method of transmitting encoded data from a transmitting data station to a receiving data station wherein the transmitting and the receiving data stations respectively each contain data terminal equipment, cipher equipment and a transmission unit and wherein synchronizing data for synchronizing the receiver cipher equipment with the cipher equipment in the transmitter and wherein encrylogical keys for encrypting data in said transmitter cipher equipment and decrypting data in said receiver cipher equipment are transmitted from the cipher equipment of the transmitting data station to the cipher equipment of the receiving data station, comprising the following steps:

(a) establishing a connection between the transmitting data station (DS1) and the receiving data station (DS2) and the data terminal equipment (DE1) of the transmitting data station (DS1) transmitting user data (BD) in the form of data blocks (DB) which, in addition to the user data (BD), contain a heading (K) with control information;

(b) replacing in at least one of the data blocks (DB), the user data (BD) by the synchronizing data (SD) and leaving the heading (K) unaltered; and (c) subsequently generating and transmitting the data block (DB) whose user data (BD) were replaced by the synchronizing data (SD); and characterized in that the data block (DB) whose user date (BD) were replaced by the synchronizing data (SD) is, when a back space request is received is generated again in the data terminal equipment (DE2) of the transmitting data station (DS1) and is retransmitted.

11. Apparatus for transmitting encoded data between a first data station to a second data station comprising, a first data terminal, a first ciphering unit and a first transmission unit interconnected in said first data station, a second data terminal, a second ciphering unit and a second transmission unit interconnected in said second data station, a packet switching network connected to said first and second data stations to interconnect them, and said first data station produces a data format which includes a heading and data blocks and has means for replacing and storing at least one of said data blocks with synchronizing data for synchronizing said first and second ciphering units and wherein encrytogical keys are transmitted for encrypting data in said transmitter cipher equipment and decrypting data in said receiver cipher equipment, and subsequently transmitting said stored data block to said second data station and including a back space request generator supplying a signal to said first data station to cause it to transmit said stored data block.

* * * * *